US012392477B1

(12) United States Patent
Huang et al.

(10) Patent No.: US 12,392,477 B1
(45) Date of Patent: Aug. 19, 2025

(54) DIRECTION-ADJUSTABLE AND QUICK-CONNECT WATERPROOF LED LIGHTING FIXTURE FOR SIGN

(71) Applicant: Rishang Optoelectronics Co., Ltd., Shenzhen (CN)

(72) Inventors: Gang Huang, Shenzhen (CN); Dulin Tao, Shenzhen (CN); Zhaozhao Yin, Shenzhen (CN); Xiaomin Yan, Shenzhen (CN); Feng Luo, Shenzhen (CN)

(73) Assignee: Rishang Optoelectronics Co., Ltd., Shenzhen (CN)

( * ) Notice: Subject to any disclaimer, the term of this patent is extended or adjusted under 35 U.S.C. 154(b) by 0 days.

(21) Appl. No.: 18/827,756

(22) Filed: Sep. 8, 2024

(51) Int. Cl.

| | |
|---|---|
| ***F21V 19/00*** | (2006.01) |
| ***F21S 2/00*** | (2016.01) |
| ***F21S 4/28*** | (2016.01) |
| ***F21V 23/06*** | (2006.01) |
| ***F21V 31/00*** | (2006.01) |
| ***G09F 13/00*** | (2006.01) |
| *F21Y 103/10* | (2016.01) |
| *F21Y 107/90* | (2016.01) |
| *F21Y 115/10* | (2016.01) |

(52) U.S. Cl.
CPC .......... *F21V 19/0045* (2013.01); *F21S 2/005* (2013.01); *F21S 4/28* (2016.01); *F21V 23/06* (2013.01); *F21V 31/005* (2013.01); *F21Y 2103/10* (2016.08); *F21Y 2107/90* (2016.08); *F21Y 2115/10* (2016.08); *G09F 13/00* (2013.01)

(58) Field of Classification Search
CPC .. G09F 13/00; F21Y 2115/10; F21Y 2107/90; F21V 31/005; F21V 23/06; F21V 19/0045; F21S 2/005; F21S 4/28
See application file for complete search history.

(56) References Cited

FOREIGN PATENT DOCUMENTS

| | | | | |
|---|---|---|---|---|
| CN | 203162711 | U | * | 8/2013 |
| CN | 212204286 | U | * | 12/2020 |
| TW | M485363 | U | * | 5/2014 |

* cited by examiner

*Primary Examiner* — Anabel Ton
(74) *Attorney, Agent, or Firm* — Birchwood IP

(57) ABSTRACT

A direction-adjustable and quick-connect waterproof LED lighting fixture for a sign is provided, which includes an aluminum profile, and further includes an isolated constant-current driver provided inside the aluminum profile and a LED module provided on an outer surface of the aluminum profile. The aluminum profile is located at an adapter at an end of the isolated constant-current driver, the adapter is concavely arranged inside the aluminum profile, and an end of the LED module is provided with a connecting line, and the connecting line penetrates through the adapter, and an angle of the connecting line can be changed through the adapter. A back surface of the LED module is bonded to the aluminum profile using a double-sided adhesive tape, and a front surface of the LED module is additionally provided with an installation clamp with an inverted structure so as to be clamped and fixed with the aluminum profile.

7 Claims, 8 Drawing Sheets

DIRECTION-ADJUSTABLE AND QUICK-CONNECT WATERPROOF LED LIGHTING FIXTURE FOR SIGN

TECHNICAL FIELD

The disclosure relates to the technical field of lighting fixtures, in particular to a direction-adjustable and quick-connect waterproof LED lighting fixture for a sign.

BACKGROUND ART

A straight tube fluorescent lamp is a type of fluorescent lamp, which emits light with a principle that mercury vapor with a low pressure radiates ultraviolet rays in a discharge process to cause fluorescent powder to emit visible light, and thus it is a low-pressure arc-discharge light source. There are two filaments in the fluorescent lamp, which are both coated with an electronic emission material, ternary carbonate, commonly known as electronic powder, and under action of an AC voltage, the filaments alternately serve as a cathode and an anode.

Installation of a traditional fluorescent lamp and light source in the sign is complicated, takes long time and consumes high power. Moreover, after installation, the lamp inside the sign does not have a waterproof function, and is easily broken when it is subjected to impact from outside, which may shorten its service life.

SUMMARY

In order to overcome existing problems, a direction-adjustable and quick-connect waterproof LED lighting fixture for a sign is provided in an embodiment of the disclosure. With installation of an adapter, an outgoing direction inside a plug and a direction of an aluminum profile can be adjusted at an angle from 0 to 180 degrees, and a back surface of the LED module is bonded to the aluminum profile using a double-sided adhesive tape, and a front surface of the LED module is additionally provided with an installation clamp with an inverted structure so as to be clamped and fixed with the aluminum profile, so that the LED module is stable and firm and quick installation can be realized, which is waterproof, convenient, reliable, energy-saving and long in service life, and can meet light-emitting requirements of the sign in different directions.

Technical schemes adopted by embodiments of the disclosure to solve technical problems are as follows.

A direction-adjustable and quick-connect waterproof LED lighting fixture for a sign includes an aluminum profile, and further includes an isolated constant-current driver provided inside the aluminum profile and a LED module provided on an outer surface of the aluminum profile. A plurality of LED modules are provided on both sides of the aluminum profile, and lighting effect can be achieved through the plurality of LED modules.

The aluminum profile is located at an adapter at an end of the isolated constant-current driver, the adapter is concavely arranged inside the aluminum profile, and an end of the LED module is provided with a connecting line, and the connecting line penetrates through the adapter, and an angle of the connecting line can be changed through the adapter, and with installation of an adapter, an outgoing direction inside a plug and a direction of the aluminum profile can be adjusted at an angle from 0 to 180 degrees, and a back surface of the LED module is bonded to the aluminum profile using a double-sided adhesive tape, and a front surface of the LED module is additionally provided with an installation clamp with an inverted structure so as to be clamped and fixed with the aluminum profile, so that the LED module is stable and firm and quick installation can be realized, which is waterproof, convenient, reliable, energy-saving and long in service life, and can meet light-emitting requirements of the sign in different directions.

Preferably, an installation clamp is provided on outer surfaces of the aluminum profile and the LED module respectively, and a clamping strip is provided at an intersection of the aluminum profile and the installation clamp.

A clamping groove is defined at an intersection of the aluminum profile and the clamping strip, and the installation clamp is clamped with the clamping groove for limiting the LED module so that a double-sided adhesive tape on the back surface of the LED module is adhered to a surface wall of the aluminum profile, and then the installation clamp is taken out, and two ends of the installation clamp are respectively clamped with the clamping grooves on both sides of the aluminum profile, and in this way, the installation clamp functions in limiting on the LED module adhered to the surface wall of the aluminum profile, thus avoiding a problem that the LED module falls off.

Preferably, a double-sided adhesive tape is provided on the back surface of the LED module for bonding to the aluminum profile, and the back surface of the LED module is bonded to the aluminum profile using the double-sided adhesive tape, and a front surface of the LED module is additionally provided with an installation clamp with an inverted structure so as to be clamped and fixed with the aluminum profile, so that the LED module is stable and reliable and rapid installation can be realized.

Preferably, a housing is provided at an position where the aluminum profile intersects with the isolated constant-current driver within the aluminum profile, and the isolated constant-current driver is concavely arranged inside the housing, a length of the housing is smaller than a length of the aluminum profile, and the length of the housing is longer than a length of the isolated constant-current driver, and the isolated constant-current driver is concavely arranged inside the housing and the housing is concavely arranged inside the aluminum profile, so that the isolated constant-current driver inside is protected by the aluminum profile and the housing.

Preferably, a plug is provided at an end of the aluminum profile, and waterproof male and female terminal lines are inserted into the plug.

A sealing ring is provided inside the plug, the sealing ring is connected with the waterproof male and female terminal lines penetrating through the plug, the sealing ring is installed inside the plug, and the waterproof male and female terminal lines penetrate through the sealing ring and then are connected with the connecting line inside the plug, so that a junction of the connecting line exhibits waterproof effect under joint action of the waterproof male and female terminal lines and the sealing ring.

Preferably, a spring connecting seat is provided at an end of the aluminum profile away from the waterproof male and female terminal lines, and the spring connecting seat is clamped and connected with the aluminum profile, and the plug at the end of the LED module is inserted into a fixing hole and a fixing pin of the spring connecting seat and is installed and fixed with an extension pressure of the spring.

The embodiments of the disclosure has following advantages:

1. With installation of an adapter, the outgoing direction inside the plug and a direction of the aluminum profile can be adjusted at an angle from 0 to 180 degrees, and the back surface of the LED module is bonded to the aluminum profile using the double-sided adhesive tape, and the front surface of the LED module is additionally provided with the installation clamp with the inverted structure so as to be clamped and fixed with the aluminum profile, so that the LED module is stable and firm and quick installation can be realized, which is waterproof, convenient, reliable, energy-saving and long in service life, and can meet light-emitting requirements of the sign in different directions.

2. The sealing ring is installed inside the plug, and the waterproof male and female terminal lines penetrate through the sealing ring and then are connected with the connecting line inside the plug, so that a junction of the connecting line exhibits waterproof effect under joint action of the waterproof male and female terminal lines and the sealing ring.

BRIEF DESCRIPTION OF THE DRAWINGS

The disclosure will be further explained in the following in combination with drawings and embodiments.

DESCRIPTION OF MAIN REFERENCE NUMERALS

1. Waterproof Male and Female Terminal Lines; 2. LED Module; 3. Aluminum Profiles; 4. Installation Clamp; 5. Connecting Line; 6. Plug; 7. Spring Connecting Seat; 8. Isolated Constant-current Driver; 9. Housing; 10. Sealing Ring; 11. Adapter; 12. Clamping Strip; 13. Clamping Groove.

DETAILED DESCRIPTION

The direction-adjustable and quick-connect waterproof LED lighting fixture for the sign is provided in an embodiment of the disclosure to overcome problems in related art. With installation of an adapter, an outgoing direction inside a plug and a direction of an aluminum profile can be adjusted at an angle from 0 to 180 degrees, and a back surface of the LED module is bonded to the aluminum profile using a double-sided adhesive tape, and a front surface of the LED module is additionally provided with an installation clamp with an inverted structure so as to be clamped and fixed with the aluminum profile, so that the LED module is stable and firm and quick installation can be realized, which is waterproof, convenient, reliable, energy-saving and long in service life, and can meet light-emitting requirements of the sign in different directions. The sealing ring is installed inside the plug, and the waterproof male and female terminal lines penetrate through the sealing ring and then are connected with the connecting line inside the plug, so that a junction of the connecting line exhibits waterproof effect under joint action of the waterproof male and female terminal lines and the sealing ring.

Technical schemes in embodiments of the disclosure solve above problems with general idea as follows.

Embodiment 1

Figure 1:
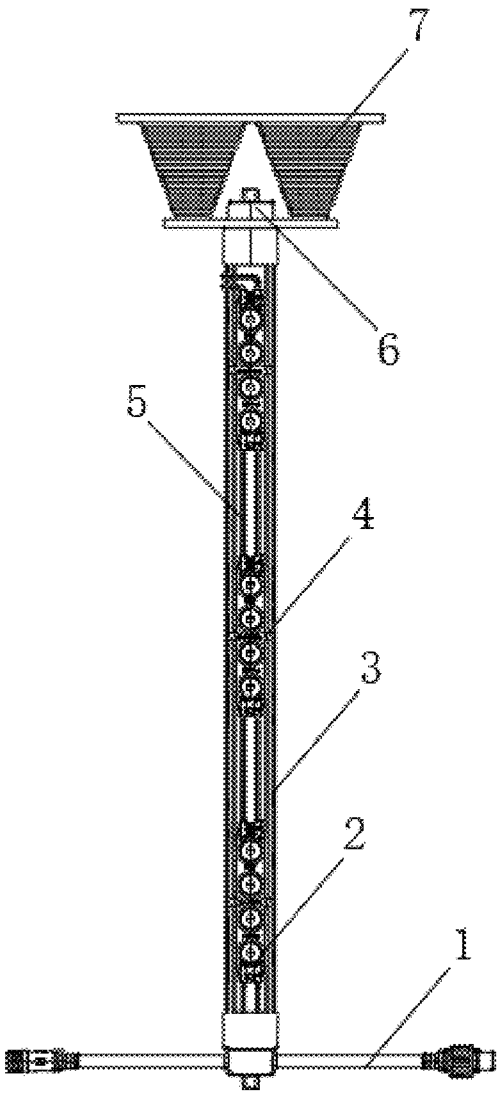
FIG. 1 is a schematic structural view of installation of a direction-adjustable and quick-connect waterproof LED lighting fixture for a sign of the disclosure.
Figure 2:
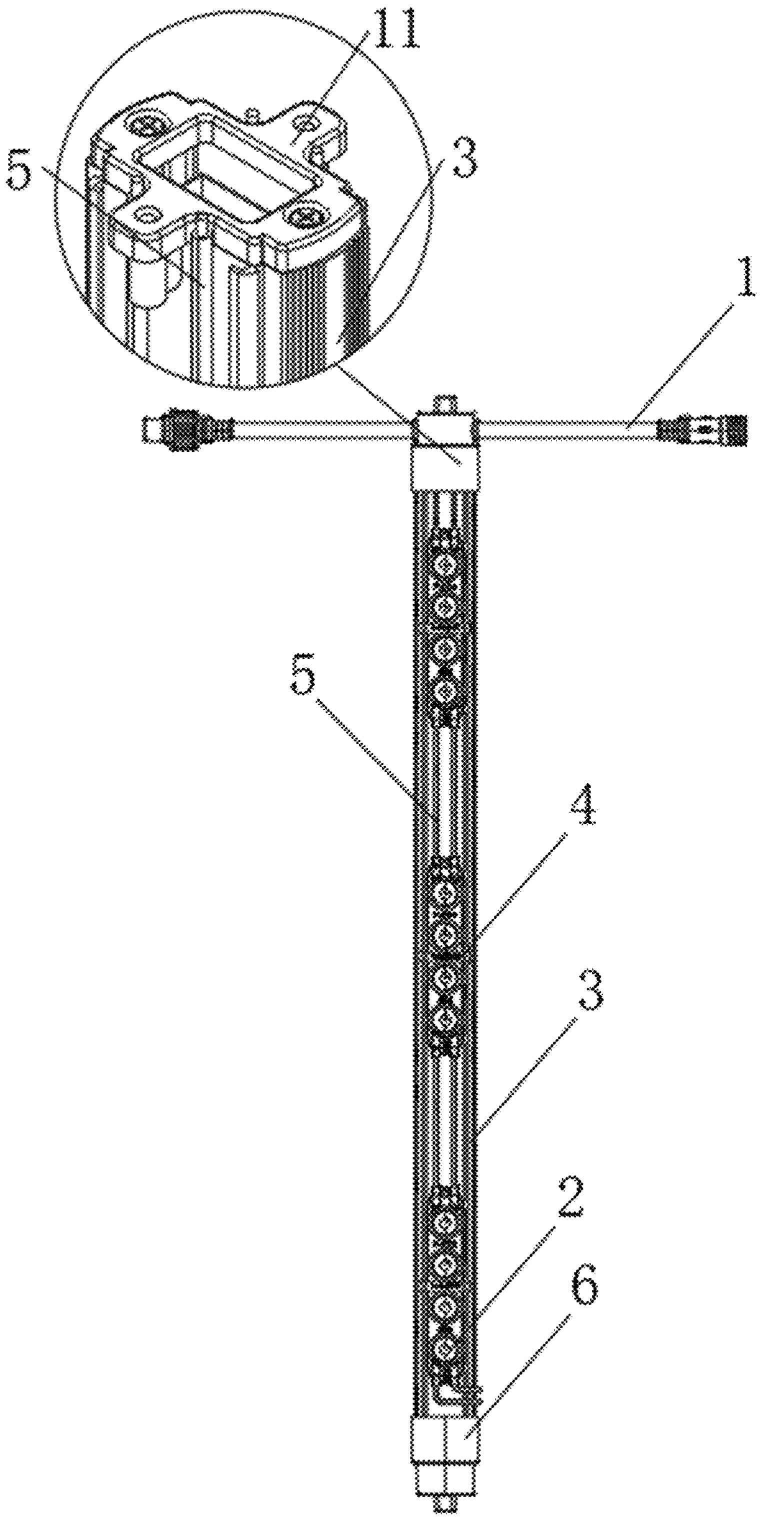
FIG. 2 is an overall front schematic structural view of a direction-adjustable and quick-connect waterproof LED lighting fixture for a sign of the disclosure.
Figure 3:
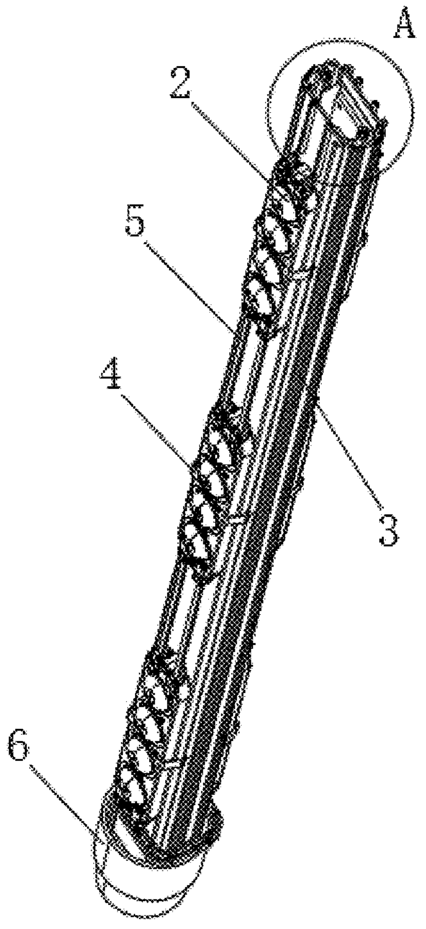
FIG. 3 is an overall schematic structural view of connection of an aluminum profile with a LED module of a direction-adjustable and quick-connect waterproof LED lighting fixture for a sign of the disclosure.
Figure 4:
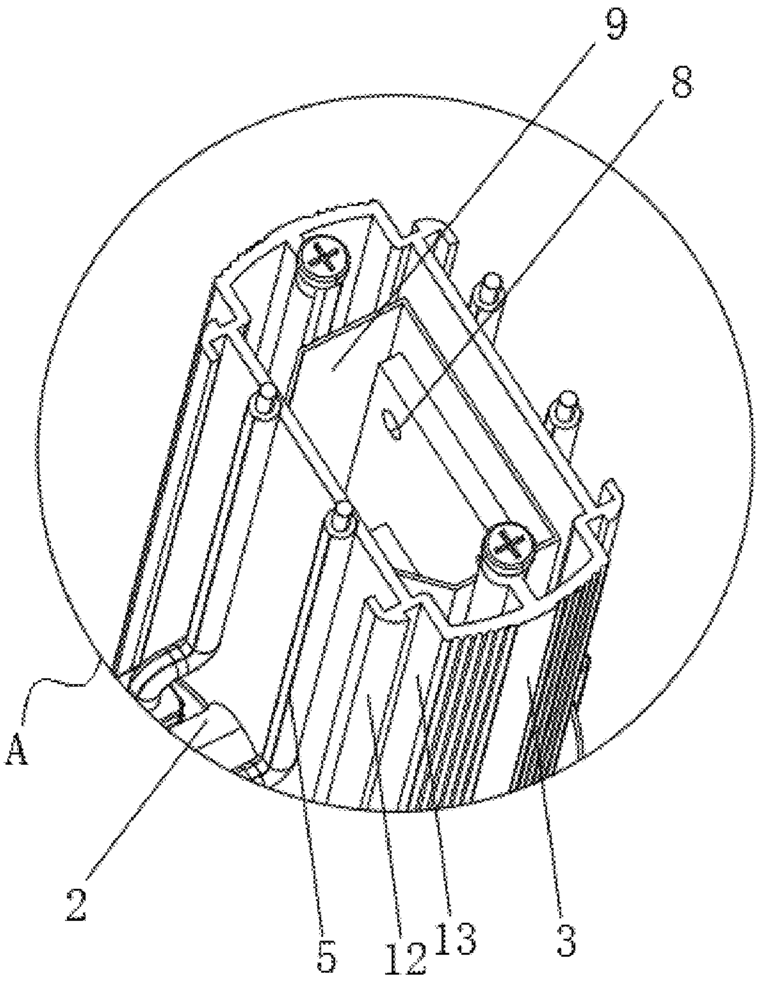
FIG. 4 is a partially enlarged structural view of the disclosure at A in FIG. 3.
Figure 5:
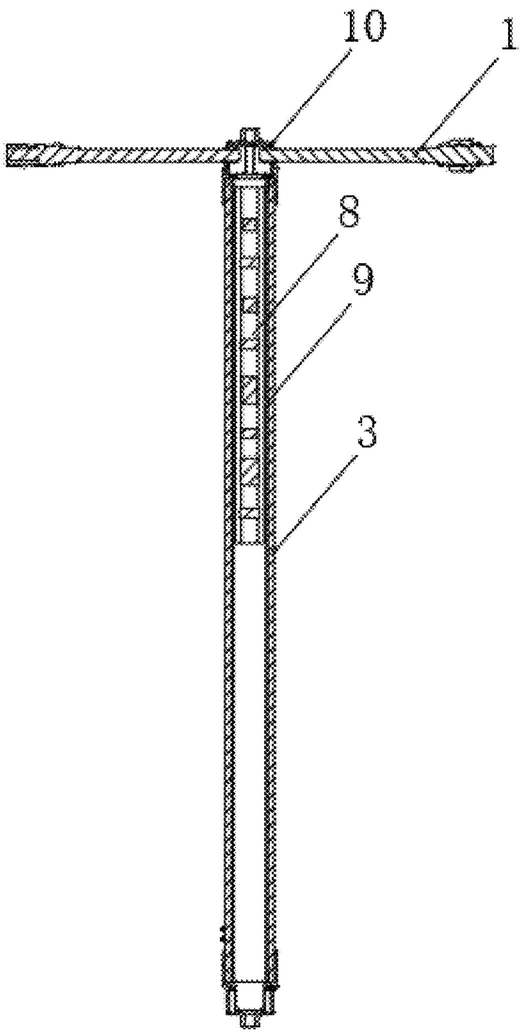
FIG. 5 is a schematic structural sectional view of a direction-adjustable and quick-connect waterproof LED lighting fixture for a sign of the disclosure.
Figure 6:
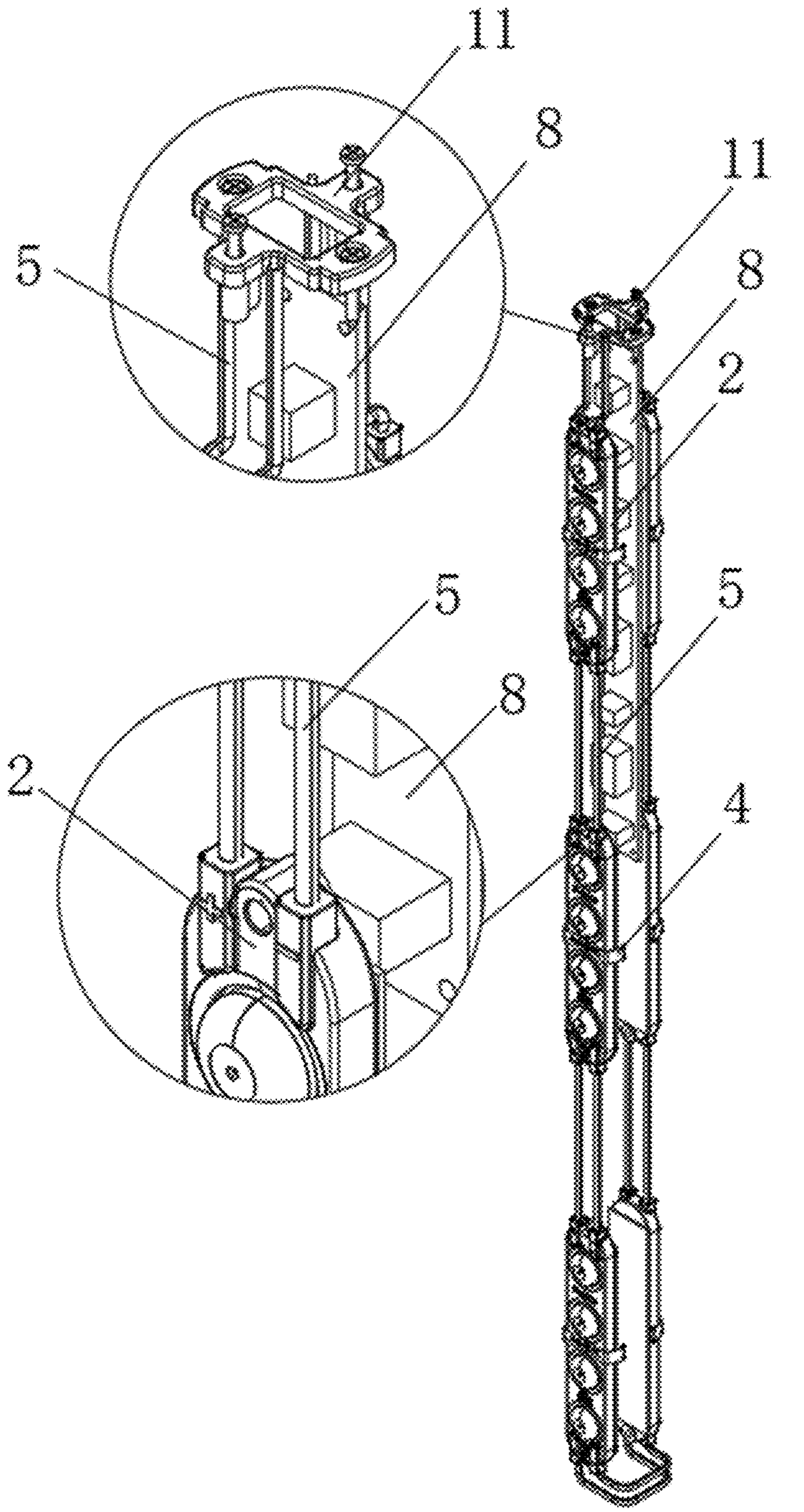
FIG. 6 is an overall schematic structural view of connection of an isolated constant-current driver with a LED module of a direction-adjustable and quick-connect waterproof LED lighting fixture for a sign of the disclosure.
Figure 7:
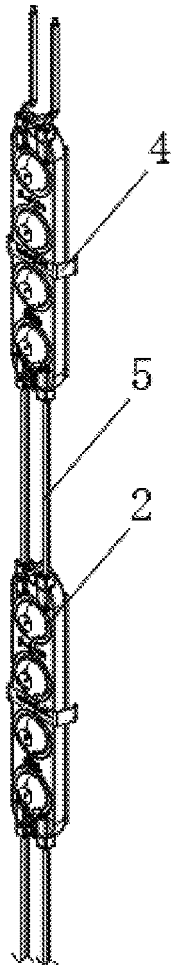
FIG. 7 is a schematic structural view of a connecting line of a LED module of a direction-adjustable and quick-connect waterproof LED lighting fixture for a sign of the disclosure.
Figure 8:
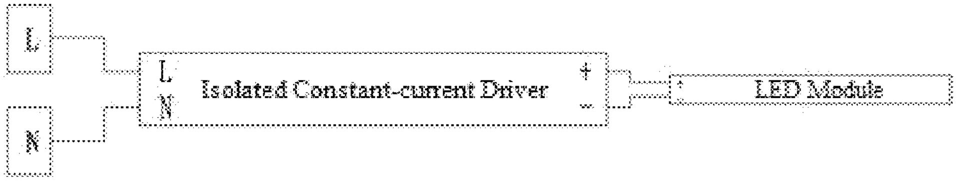
FIG. 8 is a schematic view of circuit connection of a direction-adjustable and quick-connect waterproof LED lighting fixture for a sign of the disclosure.

This embodiment gives a specific structure of a direction-adjustable and quick-connect waterproof LED lighting fixture for a sign, as shown in FIGS. 1 to 8, which includes an aluminum profile 3, and further includes an isolated constant-current driver 8 provided inside the aluminum profile 3 and a LED module 2 provided on an outer surface of the aluminum profile 3. A plurality of LED modules 2 are provided on both sides of the aluminum profile 3, and lighting effect can be achieved through the plurality of LED modules 2.

The aluminum profile 3 is located at an adapter 11 at an end of the isolated constant-current driver 8, the adapter 11 is concavely arranged inside the aluminum profile 3, and an end of the LED module 2 is provided with a connecting line 5, and the connecting line 5 penetrates through the adapter 11, and an angle of the connecting line 5 can be changed through the adapter 11, and with installation of the adapter 11, an outgoing direction inside a plug 6 and a direction of the aluminum profile 3 can be adjusted at an angle from 0 to 180 degrees, and a back surface of the LED module 2 is bonded to the aluminum profile 3 using a double-sided adhesive tape, and a front surface of the LED module is additionally provided with an installation clamp 4 with an inverted structure so as to be clamped and fixed with the aluminum profile 3, so that the LED module 2 is stable and firm and quick installation can be realized, which is waterproof, convenient, reliable, energy-saving and long in service life, and can meet light-emitting requirements of the sign in different directions.

An installation clamp 4 is provided on outer surfaces of the aluminum profile 3 and the LED module 2 respectively, and a clamping strip 12 is provided at an intersection of the aluminum profile 3 and the installation clamp 4.

A clamping groove 13 is defined at an intersection of the aluminum profile 3 and the clamping strip 12, and the installation clamp 4 is clamped with the clamping groove 13 for limiting the LED module 2 so that a double-sided adhesive tape on the back surface of the LED module 2 is adhered to a surface wall of the aluminum profile 3, and then the installation clamp 4 is taken out, and two ends of the installation clamp 4 are respectively clamped with the clamping grooves 13 on both sides of the aluminum profile 3, and in this way, the installation clamp 4 functions in limiting on the LED module 2 adhered to the surface wall of the aluminum profile 3, thus avoiding a problem that the LED module 2 falls off.

A double-sided adhesive tape is provided on the back surface of the LED module 2 for bonding to the aluminum profile 3, and the back surface of the LED module 2 is bonded to the aluminum profile 3 using the double-sided adhesive tape, and a front surface of the LED module is additionally provided with an installation clamp 4 with an inverted structure so as to be clamped and fixed with the aluminum profile 3, so that the LED module 2 is stable and reliable and rapid installation can be realized.

By using the technical scheme above:

a double-sided adhesive tape on the back surface of the LED module 2 is adhered to a surface wall of the aluminum profile 3, and then the installation clamp 4 is taken out, and two ends of the installation clamp 4 are respectively clamped with the clamping grooves 13 on both sides of the aluminum profile 3, and in this way, the installation clamp 4 functions in limiting on the LED module 2 adhered to the surface wall of the aluminum profile 3, thus avoiding a problem that the LED module 2 falls off.

Embodiment 2

This embodiment gives a specific structure of a direction-adjustable and quick-connect waterproof LED lighting fixture for a sign, as shown in FIGS. 1 to 8, in which a housing 9 is provided at an position where the aluminum profile 3 intersects with the isolated constant-current driver 8 within the aluminum profile, and the isolated constant-current driver 8 is concavely arranged inside the housing 9, a length of the housing 9 is smaller than a length of the aluminum profile 3, and the length of the housing 9 is longer than a length of the isolated constant-current driver 8, and the isolated constant-current driver 8 is concavely arranged inside the housing 9 and the housing 9 is concavely arranged inside the aluminum profile 3, so that the isolated constant-current driver 8 inside is protected by the aluminum profile 3 and the housing 9.

A plug 6 is provided at an end of the aluminum profile 3, and waterproof male and female terminal lines 1 are inserted into the plug 6.

A sealing ring 10 is provided inside the plug 6, the sealing ring 10 is connected with the waterproof male and female terminal lines 1 penetrating through the plug 6, the sealing ring 10 is installed inside the plug 6, and the waterproof male and female terminal lines 1 penetrate through the sealing ring 10 and then are connected with the connecting line 5 inside the plug 6, so that a junction of the connecting line 5 exhibits waterproof effect under joint action of the waterproof male and female terminal lines 1 and the sealing ring 10.

A spring connecting seat 7 is provided at an end of the aluminum profile 3 away from the waterproof male and female terminal lines 1, and the spring connecting seat 7 is clamped and connected with the aluminum profile 3, and the plug 6 at the end of the LED module 2 is inserted into a fixing hole and a fixing pin of the spring connecting seat 7 and is installed and fixed with an extension pressure of the spring.

By using the technical scheme above:

the sealing ring 10 is connected with the waterproof male and female terminal lines 1 penetrating through the plug 6, the sealing ring 10 is installed inside the plug 6, and the waterproof male and female terminal lines 1 penetrate through the sealing ring 10 and then are connected with the connecting line 5 inside the plug 6, so that the junction of the connecting line 5 exhibits waterproof effect under the joint action of the waterproof male and female terminal lines 1 and the sealing ring 10.

Operation principle: a plurality of LED modules 2 are fixed to the aluminum profile 3, and the isolated constant-current driver 8 is installed in a hollow of the housing 9 inside the aluminum profile 3. The LED modules 2 are connected with a output terminal of the isolated constant-current driver 8 with an electronic line, and an input terminal of the isolated constant-current driver 8 is connected with the waterproof male and female terminal lines 1, which are connected with commercial power for power supply through L/N wires of the waterproof male and female terminal lines 1.

When the LED module 2 is installed, the double-sided adhesive tape on the back surface of the LED module 2 is adhered to the surface wall of the aluminum profile 3, and then the installation clamp 4 is taken out, and two ends of the installation clamp 4 are respectively clamped with the clamping grooves 13 on both sides of the aluminum profile 3, and in this way, the installation clamp 4 functions in limiting on the LED module 2 adhered to the surface wall of the aluminum profile 3, and the plug 6 at the end of the LED module 2 is inserted into the fixing hole and the fixing pin of the spring connecting seat 7 and is installed and fixed with an extension pressure of the spring.

Then, the sealing ring 10 is installed inside the plug 6, and the waterproof male and female terminal lines 1 penetrate through the sealing ring 10 and then are connected with the connecting line 5 inside the plug 6, so that the waterproof male and female terminal lines 1 connect the connecting line 5 to a power supply, and the junction of the connecting line 5 exhibits waterproof effect under the joint action of the waterproof male and female terminal lines 1 and the sealing ring 10.

Meanwhile, with installation of the adapter 11, the outgoing direction inside the plug 6 and the direction of the aluminum profile 3 can be adjusted at an angle from 0 to 180 degrees and an angle of the connecting line 5 can be changed, and the back surface of the LED module 2 is bonded to the aluminum profile 3 using the double-sided adhesive tape, and the front surface of the LED module is additionally provided with the installation clamp 4 with the inverted structure so as to be clamped and fixed with the aluminum profile 3, so that the LED module 2 is stable and firm and quick installation can be realized, which is waterproof, convenient, reliable, energy-saving and long in service life, and can meet light-emitting requirements of the sign in different directions.

Finally, it should be noted that obviously, the above embodiments are only examples for clearly explaining the disclosure, but not limitation on implementations. For those ordinary skilled in the art, other variations and modifications can be made based on above description. There is no need, and it is impossible, to exhaust all of embodiments herein. Obvious changes or variations derived therefrom are still within the protection scope of this disclosure.

The invention claimed is:

1. A direction-adjustable and quick-connect waterproof LED lighting fixture for a sign, comprising an aluminum profile (3) and further comprising an isolated constant-current driver (8) provided inside the aluminum profile (3) and an LED module (2) provided on an outer surface of the aluminum profile (3);

wherein the aluminum profile (3) is located at an adapter (11) at an end of the isolated constant-current driver (8), the adapter (11) is concavely arranged inside the aluminum profile (3), and an end of the LED module (2) is provided with a connecting line (5), and the connecting line (5) penetrates through the adapter (11), and the adapter (11) is configured to change an angle of the connecting line (5);

wherein a housing (9) is provided at an position where the aluminum profile (3) intersects with the isolated constant-current driver (8) within the aluminum profile, and the isolated constant-current driver (8) is concavely arranged inside the housing (9).

2. The direction-adjustable and quick-connect waterproof LED lighting fixture for the sign according to claim 1, wherein an installation clamp (4) is provided on outer surfaces of the aluminum profile (3) and the LED module (2) respectively, and a clamping strip (12) is provided at an intersection of the aluminum profile (3) and the installation clamp (4); and wherein a clamping groove (13) is defined at an intersection of the aluminum profile (3) and the clamping strip (12), and the installation clamp (4) is clamped with the clamping groove (13) for limiting the LED module (2).

3. The direction-adjustable and quick-connect waterproof LED lighting fixture for the sign according to claim 2, wherein a double-sided adhesive tape is provided on a back surface of the LED module (2) for bonding to the aluminum profile (3).

4. The direction-adjustable and quick-connect waterproof LED lighting fixture for the sign according to claim 1, wherein a plug (6) is provided at an end of the aluminum profile (3), and waterproof male and female terminal lines (1) are inserted into the plug (6);

wherein a sealing ring (10) is provided inside the plug (6), the sealing ring (10) is connected with the waterproof male and female terminal lines (1) penetrating through the plug (6).

5. The direction-adjustable and quick-connect waterproof LED lighting fixture for the sign according to claim 4, wherein a spring connecting seat (7) is provided at an end of the aluminum profile (3) away from the waterproof male and female terminal lines (1), and the spring connecting seat (7) is clamped and connected with the aluminum profile (3).

6. The direction-adjustable and quick-connect waterproof LED lighting fixture for the sign according to claim 1, wherein a length of the housing (9) is smaller than a length of the aluminum profile (3).

7. The direction-adjustable and quick-connect waterproof LED lighting fixture for the sign according to claim 1, wherein a plurality of LED modules (3) are provided on both sides of the aluminum profile (2).

* * * * *